United States Patent [19]
Hydes

[11] Patent Number: 6,156,087
[45] Date of Patent: Dec. 5, 2000

[54] DUST COLLECTION SYSTEM

[75] Inventor: Ernie Hydes, Lutz, Fla.

[73] Assignee: LaFarge Corporation, Reston, Va.

[21] Appl. No.: 09/263,523

[22] Filed: Mar. 5, 1999

[51] Int. Cl.$^7$ ....................................................... B65B 1/30
[52] U.S. Cl. ............................ 55/385.1; 55/397; 55/442; 141/286; 141/326; 414/291
[58] Field of Search ............................ 55/397, 434, 442, 55/443, 385.1; 141/192, 198, 286, 326; 414/291, 292

[56] References Cited

U.S. PATENT DOCUMENTS

| | | | |
|---|---|---|---|
| 2,203,592 | 6/1940 | Brundage | 55/442 |
| 3,355,864 | 12/1967 | Sobeck | 55/443 |
| 3,396,515 | 8/1968 | Wright | 55/434 |
| 3,412,531 | 11/1968 | Schwab | 55/434 |
| 3,883,011 | 5/1975 | Pennell . | |
| 3,885,606 | 5/1975 | Krauss . | |
| 3,908,720 | 9/1975 | Garnett . | |
| 4,324,524 | 4/1982 | Burston et al. . | |
| 4,699,187 | 10/1987 | Binzen . | |
| 4,727,913 | 3/1988 | Bliss . | |
| 4,832,710 | 5/1989 | Jury | 55/442 |
| 4,857,276 | 8/1989 | Seto et al. | 55/443 |
| 5,034,035 | 7/1991 | Satmer et al. | 55/443 |
| 5,122,168 | 6/1992 | Torres | 55/434 |
| 5,544,686 | 8/1996 | Kearney . | |

FOREIGN PATENT DOCUMENTS

| | | | |
|---|---|---|---|
| 2120471 | 8/1972 | France | 55/442 |

*Primary Examiner*—David A. Simmons
*Assistant Examiner*—Minh-Chau T. Pham
*Attorney, Agent, or Firm*—Burns, Doane, Swecker & Mathis, L.L.P.

[57] ABSTRACT

A dust collection system includes a frame defining an opening through which a particulate material is inserted; a plurality of hollow supports extending across the opening; at least one plate extending along a length of each of the plurality of hollow supports, each of said plates extending from its respective one of the plurality of hollow supports in a downward direction; a plurality of openings extending along a lower side of each of the plurality of hollow supports; and a device for drawing dust in through the plurality of openings.

12 Claims, 4 Drawing Sheets

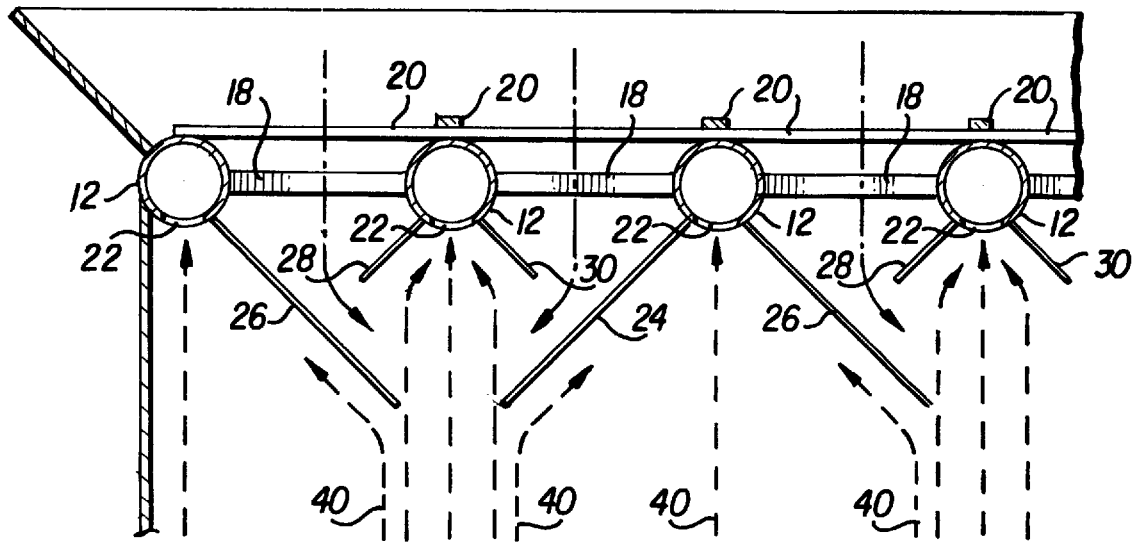
FIG. 3
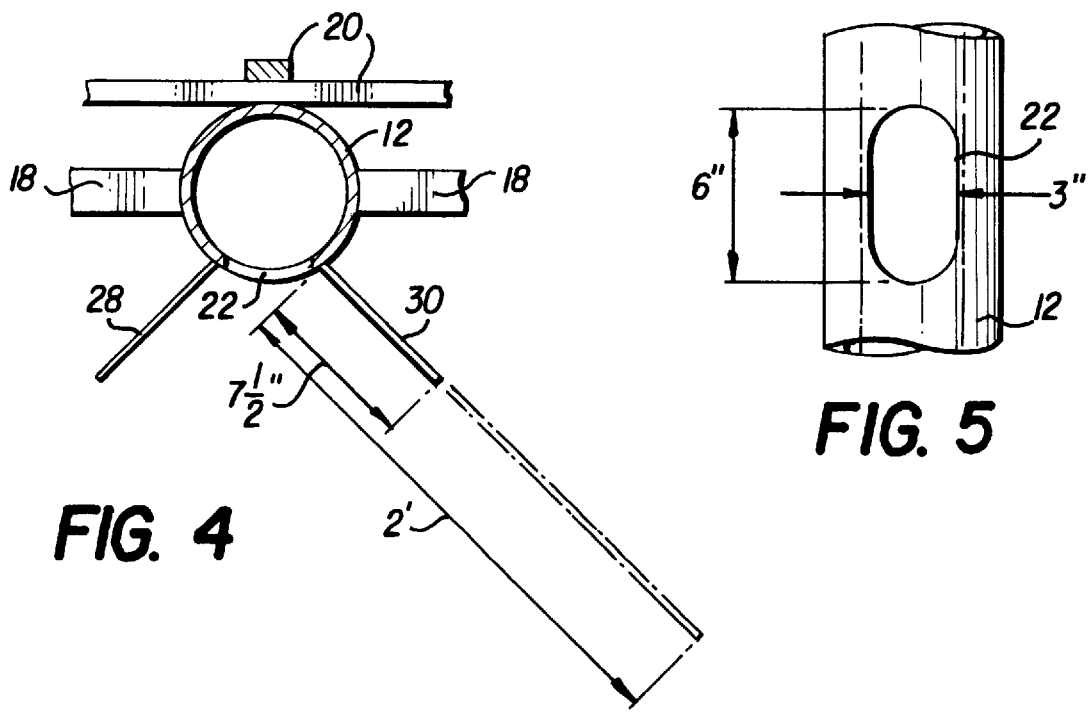
FIG. 4
FIG. 5

DUST COLLECTION SYSTEM

BACKGROUND OF THE INVENTION

1. Field of the Invention

The present invention relates to a dust collection system, and in particular, to an arrangement on top of a hopper for preventing excessive dust from escaping into the atmosphere during loading of the hopper.

2. Description of Related Art

Although the present invention is primarily intended to minimize dust during the loading of dockside mobile hoppers with clinker using ship cranes, the application has widespread application. For example, the present invention could be utilized in grain bins, and in any other application in which particulate matter generates unacceptable levels of dust during loading thereof.

Many states have environmental regulations controlling and limiting the generation of dust. See, e.g., Chapter 403 of Title 62 of the Florida Statutes and the rules promulgated thereunder in the Florida Administrative Code. See, in particular, Section 62-204, F.A.C.

Prior to the present invention, several efforts had been made to control dust. For example, U.S. Pat. No. 4,324,524 discloses a dust retention device for containing dust arising from the handling of particulate material. The '524 patent discloses a plurality of shutters 6, 7, 8, that are suspended from rods 9. However, the shutters 6, 7, 8 are not overlapping, and there is an opening between the shutters through which dust can escape. Furthermore, the shutters are able to pivot or rotate about the rods 9, thus enabling the openings to become rather significant. As a result, large quantities of dust may be emitted through these openings.

U.S. Pat. No. 4,699,187 discloses another dust control system. The system disclosed in '187 patent utilizes large shield plates 24, 24' to trap dust therebeneath. The system disclosed in the '187 patent does not utilize a plurality of openings extending along the area underneath the plates 24, 24'. Instead, the disclosed system utilizes collectors 20, 20' at each end of the system. In addition, the '187 system includes a fabric filter 22 over the intake areas, which would limit the ability of the system to collect and remove dust.

U.S. Pat. No. 3,885,606 discloses an apparatus for loading fine granular and pulverized loose solids. The disclosed apparatus seems more concerned with breaking up the material and removing air from it, than for containing dust.

Accordingly, prior to the present invention, there existed a need in the art for an economical and effective system for minimizing the amount of dust generated when loose particulate material, such as cement clinker, is loaded into a hopper.

OBJECTS AND SUMMARY

It is an object of the present invention to provide a dust collection system that effectively collects dust as particulate matter is loaded into hoppers.

It is another object of the present invention to provide a dust collection system that includes a plurality of small ports evenly distributed throughout the opening to the hopper so that the dust can be collected in small, uniform quantities.

It is still, yet another object of the present invention to provide a dust collection system that includes a plurality of inverted V-shaped plates that are arranged in an overlapping matter to promote effectiveness in collecting the dust.

It is still another object of the present invention to provide a dust collection system, wherein the ports for collecting the dust are provided at the apex of inverted V-shaped plates so that the dust, which naturally rises upwardly, is collected through the ports.

According to the present invention, the dust collection system includes a frame defining an opening through which a particulate material is inserted, and a plurality of hollow supports extending across the opening. The system further includes at least one plate extending along a length of each of the plurality of hollow supports, wherein each of the plates extends from its respective one of the plurality of hollow supports in a downward direction. A plurality of openings extends along a lower side of each of the plurality of hollow supports, and a device for drawing dust in through the plurality of openings is also provided.

BRIEF DESCRIPTION OF THE DRAWINGS

FIG. 3 is a cross-sectional view taken along lines 33 of FIG. 2;

FIG. 4 is a detailed view of FIG. 3;

FIG. 5 is a view of the underside of one of the pipes of FIG. 3 illustrating the openings therein;

DETAILED DESCRIPTION OF THE PREFERRED EMBODIMENTS

Figure 1:
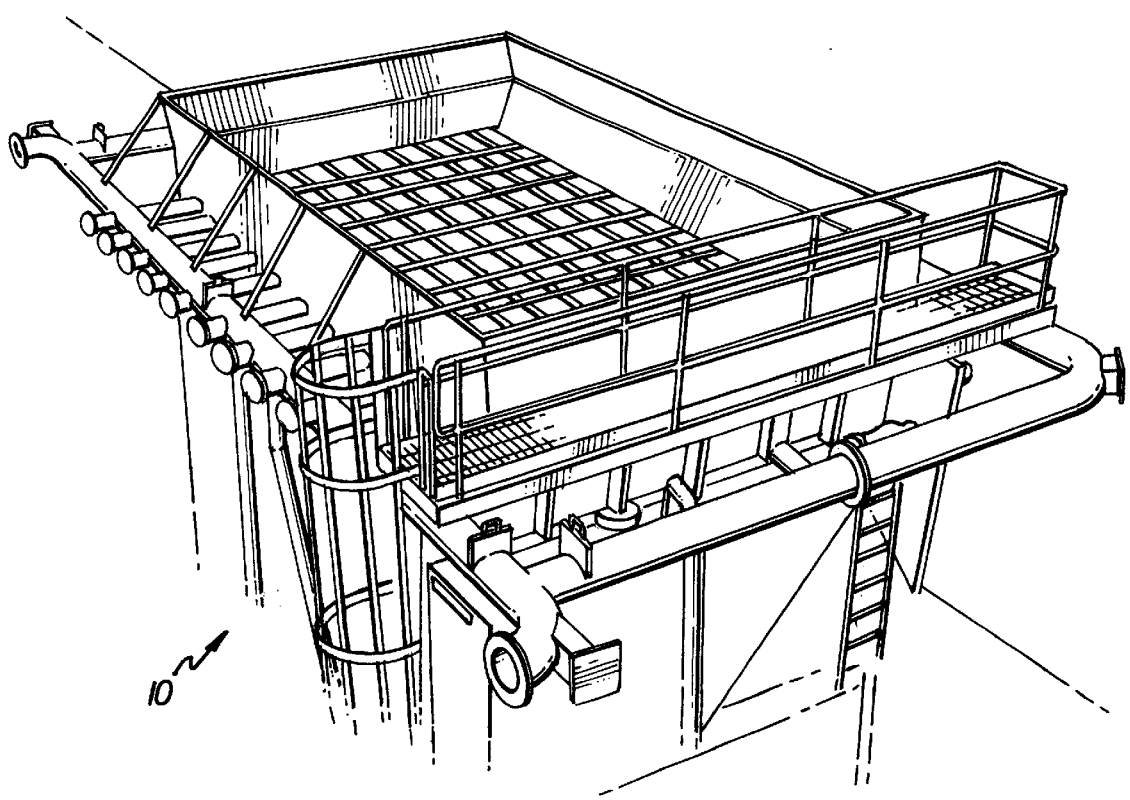
FIG. 1 is a top perspective view of a cement hopper incorporating the present invention.

The present invention relates to a dust collection system for collecting dust from clinker material as the clinker material is loaded into hoppers using a crane bucket. However, the present invention has wide applicability, and may also be used in other environments, such as in grain bins or in other hoppers for loose, particulate material.

According to one preferred embodiment, a mobile hopper 10 is located at the edge of a dock for receiving clinker material from a ship. At the top of the hopper is a frame that includes a plurality of hollow support pipes 12 extending in parallel across the frame opening. The hollow support pipes 12 are supported at each end by manifold pipes 14, 16. Enlarged junction sections 32 form the transition between the hollow support pipes 12 and the manifold pipes 14, 16.

Each of hollow support pipes 12 are spaced from each other by approximately two feet, on centers. The hollow support pipes 12 are preferably eight inch diameter, schedule 80 pipes. However, alternatives may be used for the hollow support pipes.

A plurality of metal bracing bars 18 are secured by welding, or some other suitable means, between the hollow support pipes 12 to provide additional structural integrity to the system. The bracing bars 18 are preferably one inch by two inches in cross section, and are about fifteen inches in length.

In addition, a grid of metal bars 20 extend across the top of the hollow support pipes 12. The bars 20 are intended to provide protection for the hollow pipes 12. For example, when the crane bucket is lowered into the hopper 10, the bucket will contact and rest upon the bars 20, without damaging the hollow pipes 12. The support bars 20 are preferably one inch by three inches in cross section.

Figure 6:
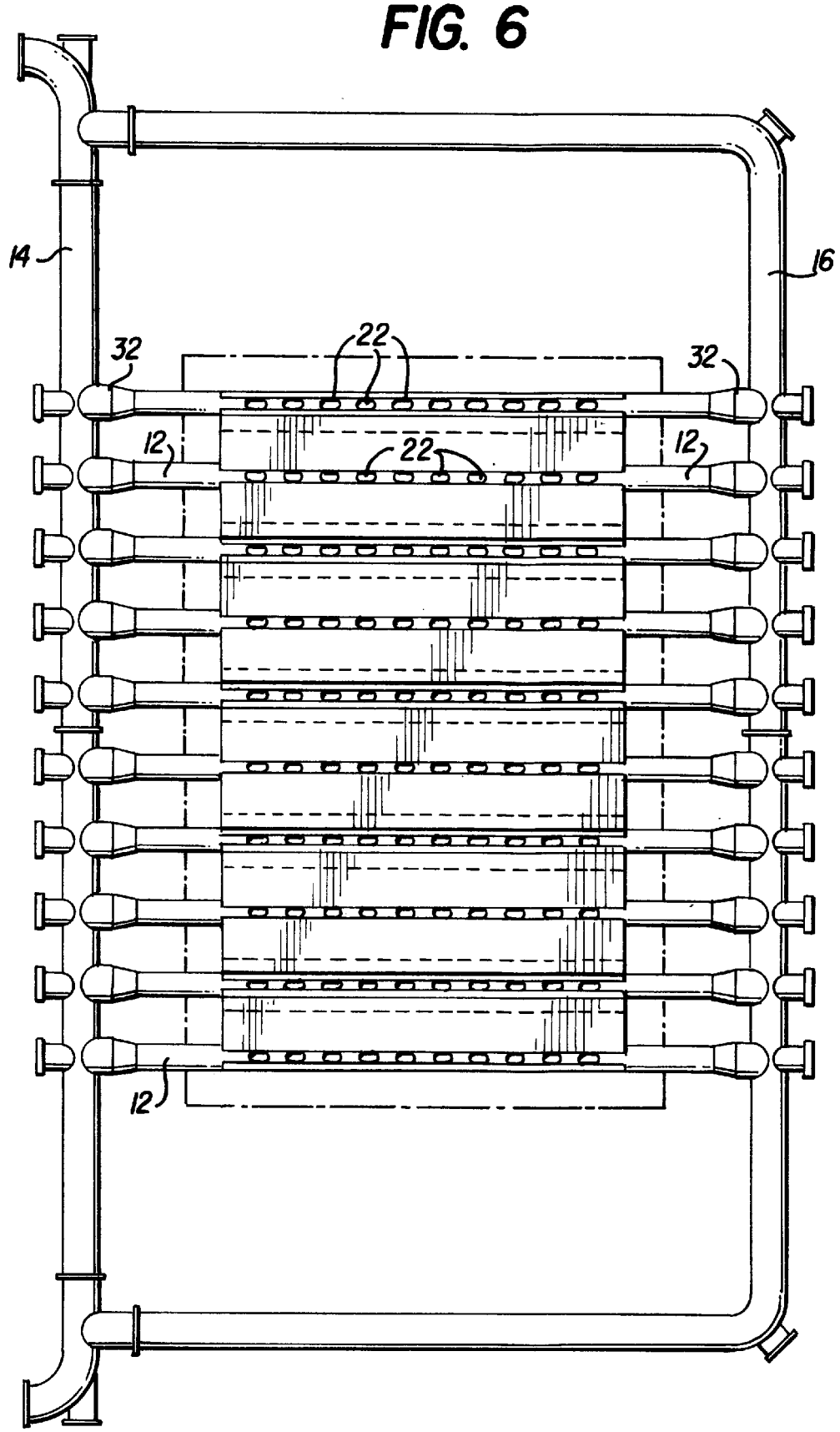
FIG. 6 is a view similar to FIG. 2, except that illustrates the underside of a central portion of the device.

At the underside of each of the hollow support pipes 12 are a plurality of openings 22. The openings are preferably oval and are preferably evenly spaced along the support pipes so that the entire opening of the frame is uniformly populated with the openings 22. See, e.g., FIG. 6. The oval openings 22 are preferably about six inches along the major axis and about three inches along the minor axis. See FIG. 5.

Every other hollow support pipe 12 includes a pair of long vanes 24, 26 extending downwardly therefrom. The vanes 24, 26 extend substantially along the entire length of each of the respective pipes 12. The vanes 24, 26 are preferably about one-quarter inch thick, which is sufficient to keep them from being bent or damaged by the clinker material dropping through the frame. The long vanes 24, 26 in a preferred embodiment are two feet in width. See FIG. 4.

On each of the hollow support pipes 12 between the previously described pipes 12 having the long vanes 24, 26, are arranged a pair of short vanes 28, 30. Each of the short vanes 28, 30 are also about one-quarter inch thick and have a width of about seven and one-half inches. See FIG. 4.

Figure 7:
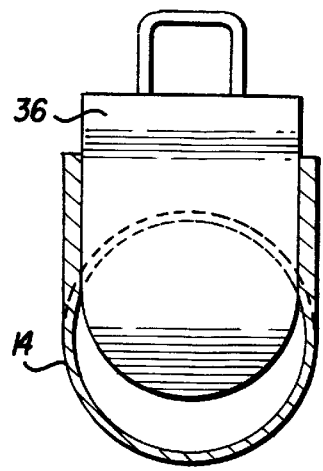
FIG. 7 is a detailed view of a cutoff plate used in the present invention.
Figure 2:
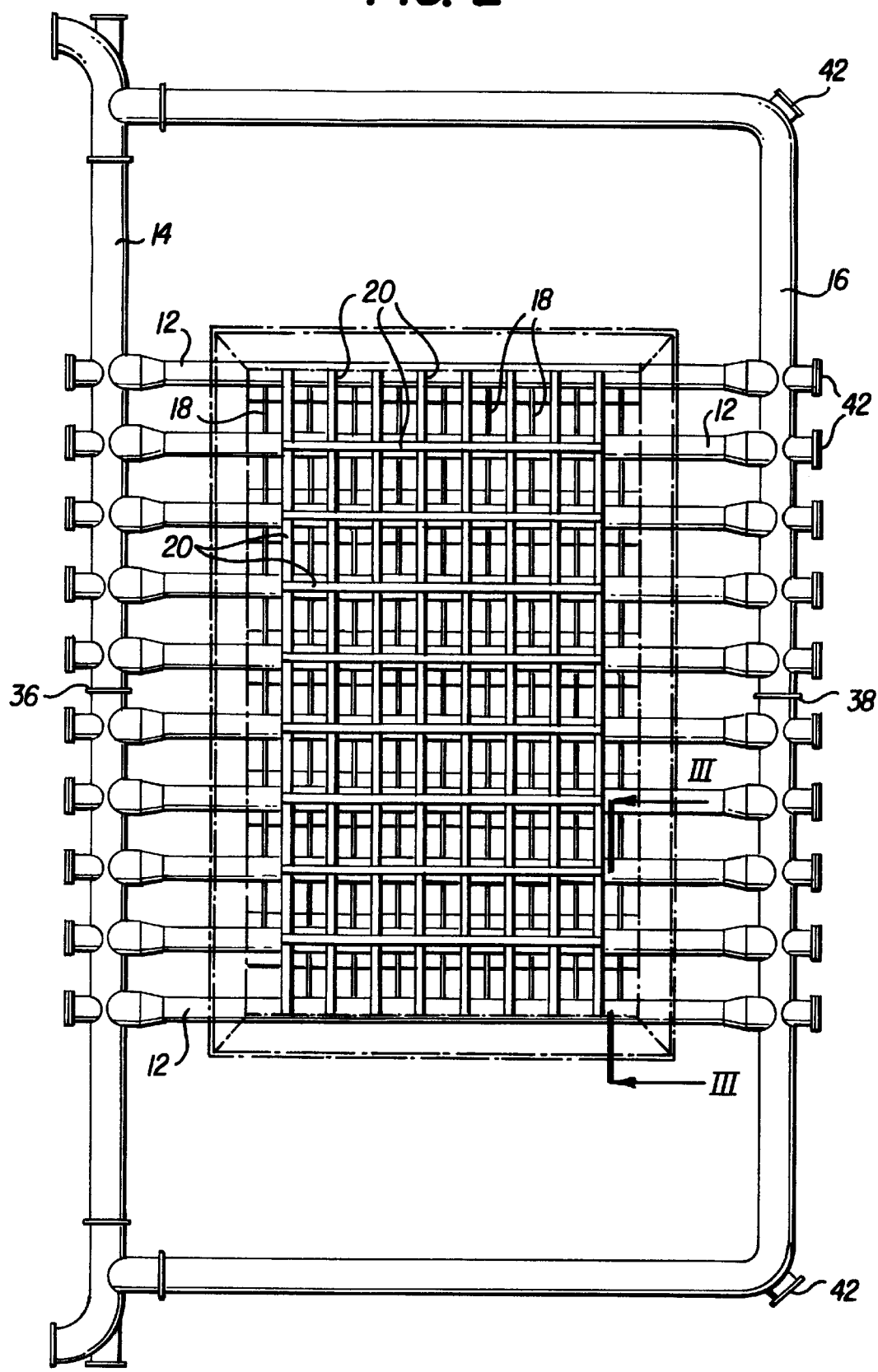
FIG. 2 is a top plan view of the present invention.

The manifold pipes 14, 16 are separated into two sections by removable separating plates 36, 38. See FIG. 7. When the separating plates 36, 38 are in place within their respective manifold pipes 14, 16, the system is essentially divided into two sections. In other words, all dust collected by the hollow support pipes 12 at the top half of FIG. 2 is directed to one dust collector, while all dust collected by the hollow support pipes 12 at the bottom half of FIG. 2 is directed to a different dust collector.

At each end of the manifold pipes 14, 16 are arranged conventional suction apparatus for creating a low pressure throughout the manifold pipes 14, 16 and the connected plurality of hollow support pipes 12. The suction apparatus collectively draws about 15,000 cubic feet per minute. The air velocity through the manifolds is about 5,000 feet per minute in a preferred embodiment.

Operation of the Apparatus:

As a load of clinker material is dropped into the hopper 10, some of the material lands on the top of the long vanes 24, 26 and cascades down the width of the long vanes 24, 26 into the hopper. The remaining portion of the clinker material lands on the short vanes, 28, 30, from which it cascades down onto the long vanes 24, 26, and joins the remaining material as it cascades into the hopper. As the material falls into the hopper, dust 40 is generated within the hopper 10 and billows upwardly. However, the upwardly moving dust 40 is trapped by the overlapping arrangement of long and short vanes 24, 26, 28, 30. Furthermore, in view of the fact that the plurality of openings 22 are located at the apex of the short and long vanes 24, 26, 28, 30, the dust 40 that has risen upwardly in the hopper 10 is sucked into the plurality of hollow support pipes 12 through the openings 22 and is carried through the manifold pipes 14, 16 to the appropriate dust containment apparatus.

At the bottom of the hopper, the clinker material encounters a vibrating feeder which charges a conveyor system which carries the clinker material to a material storage building.

Because the plurality of openings 22 are uniformly situated throughout the frame opening of the hopper 10, the dust 40 is collected in small portions reducing the likelihood of clogging. In addition, because of the large plurality of openings 22, very little dust escapes upwardly through the plates. The majority of the dust is contained within the system.

Clean out ports 42 are provided on each of the manifold pipes 14, 16, preferably in alignment with the hollow pipes 12. Thus, the plates on the clean out ports 42 can be removed providing easy access for cleaning out the hollow pipes 12. In addition, clean out ports can also be provided on corners of the manifolds 14, 16 or in any other location that may require periodic cleaning.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A dust collection system, comprising:
    a frame defining an opening through which a particulate material is inserted;
    a plurality of hollow supports extending across the opening;
    at least one plate extending along a length of each of the plurality of hollow supports, each of said plates extending from said respective one of the plurality of hollow supports in a downward direction;
    a plurality of openings extending along a lower side of each of the plurality of hollow supports; and
    means for drawing dust in through the plurality of openings.

2. The dust collection system of claim 1, wherein each of the plurality of hollow supports includes two plates extending downwardly therefrom so as to form an inverted V.

3. The dust collection system of claim 2, wherein the plates of every other of the hollow supports are wider in a direction transverse to the longitudinal direction of the hollow supports than the plates of the remaining hollow supports.

4. The dust collection system of claim 3, wherein the longer plates of the every other hollow supports extend beneath the plates of the remaining hollow supports.

5. The dust collection system of claim 1, further comprising a collection pipe extending along one end of the plurality of hollow supports, and the hollow supports are connected to the collection pipe so that dust drawn into the hollow supports can pass through the collection pipe to a dust collector.

6. A dust collection system, comprising:
    a frame defining an opening through which a particulate material is inserted;
    a plurality of hollow supports extending across the opening, each of the hollow supports including a plurality of openings extending along a lower side thereof;
    a plurality of overlapping plates extending in a downward direction from the plurality of hollow supports and arranged such that any dust traveling straight up in a vertical direction from below the frame will contact at least one of the plurality of overlapping plates; and
    means for drawing dust in through the plurality of openings.

7. The dust collection system of claim 6, wherein each of the plurality of hollow supports includes two of the overlapping plates extending downwardly therefrom so as to form an inverted V.

8. The dust collection system of claim 7, wherein the plates of every other of the hollow supports are wider in a direction transverse to the longitudinal direction of the hollow supports than the plates of the remaining hollow supports.

9. The dust collection system of claim 8, wherein the longer plates of the every other hollow supports extend beneath the plates of the remaining hollow supports.

10. The dust collection system of claim 6, further comprising a collection pipe extending along one end of the plurality of hollow supports, and the hollow supports are connected to the collection pipe so that dust drawn into the hollow supports can pass through the collection pipe to a dust collector.

11. The dust collection system of claim 1, wherein said at least one plate begins to extend from said plurality of hollow supports at a position higher than said plurality of openings.

12. The dust collection system of claim 6, wherein said plurality of overlapping plates begin to extend from said plurality of hollow supports at a position higher than said plurality of openings.

* * * * *